(12) United States Patent
Takeuchi et al.

(10) Patent No.: US 7,020,627 B1
(45) Date of Patent: Mar. 28, 2006

(54) MATERIAL PROCUREMENT SYSTEM AND A MATERIAL PROCUREMENT METHOD

(75) Inventors: Mitsuru Takeuchi, Tokyo (JP); Kazuhisa Masimo, Tokyo (JP); Kaoru Nakamura, Tokyo (JP); Miho Murano, Tokyo (JP); Norihiko Iio, Tokyo (JP); Hidenori Akita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 687 days.

(21) Appl. No.: 09/718,384

(22) Filed: Nov. 24, 2000

(30) Foreign Application Priority Data

Mar. 10, 2000 (JP) ............................... 2000-066019

(51) Int. Cl.
*G06F 15/24* (2006.01)
(52) U.S. Cl. .............................. 705/28; 705/22; 705/29
(58) Field of Classification Search ................ 705/28, 705/29, 26, 22, 34
See application file for complete search history.

(56) References Cited

U.S. PATENT DOCUMENTS

| | | | | |
|---|---|---|---|---|
| 5,319,542 A * | 6/1994 | King, Jr. et al. | ............... | 705/27 |
| 5,402,336 A * | 3/1995 | Spiegelhoff et al. | ........... | 705/8 |
| 6,101,484 A * | 8/2000 | Halbert et al. | ................ | 705/26 |
| 6,154,738 A * | 11/2000 | Call | .............................. | 707/4 |
| 6,260,024 B1 * | 7/2001 | Shkedy | ........................ | 705/37 |
| 6,604,089 B1 * | 8/2003 | Van Horn et al. | ............. | 705/26 |

FOREIGN PATENT DOCUMENTS

| | | |
|---|---|---|
| JP | 5-143624 | 6/1993 |
| JP | 05-233655 | 9/1993 |
| JP | 6-259442 | 9/1994 |
| JP | 7-121619 | 5/1995 |
| JP | 11-134414 | 5/1999 |
| JP | 11-250149 | 9/1999 |
| JP | 11-296752 | 10/1999 |

OTHER PUBLICATIONS

Jesitus, John, "Steering system supplier handles inventory with ADC", 11/19998, Automatic I.D. News, v14n12, p.: 32-33.*

* cited by examiner

*Primary Examiner*—F. Zeender
(74) *Attorney, Agent, or Firm*—Buchanan Ingersoll PC (57) ABSTRACT

A plurality of orderers with their own code systems procures materials from companies (supply companies) with which the orderers have business relations. In this material procurement system, a name register master is provided for making correspondence between goods name codes provided by each of the supply companies and material codes of the orderers. When necessary materials are procured from the supply company, the orderer goods name codes are used for specifying the materials. Further, an order processor is provided. The order processor refers to the name register master, and combines orders of the materials with a same orderer goods name, if the same goods name of the supply company is in the name register master. The order processor also divides the orders and orders to another company by referring to the name register master, if the materials in a quantity beyond a predetermined number must be ordered.

7 Claims, 11 Drawing Sheets

BUSINESS DATA 21a, 21b

| No. | ORDERER (OFFICE) CODE | SUPPLY COMPANY CODE | ORDERER GOODS NAME (MATERIAL) CODES | SUPPLY CO. GOODS NAME (MAKER TYPE NAME) C. | UNIFIED CODES | EXPLANATION |
|---|---|---|---|---|---|---|
| 1 | 1101 108420171 | 111111 | BLANK | BLANK | M31 | NOT FOR REGISTERATION SINCE NO MATERIAL CODE SUPPLIED |
| 2 | 1101 108420171 | 111111 | HHCD01 | BLANK | M31 | NOT FOR REGISTERATION SINCE FLAG IS SET TO 1 |
| 3 | 1101 108420171 | 111111 | HHCD02 | JHCD02 | M31 | NOT FOR REGISTERATION SINCE NAME REGISTER MASTER EXISTS |
| 4 | 1101 108420171 | 111111 | HHCD03 | JHCD03 | M31 | REGISTER AS NO NAME EXISTS IN NAME REGISTER MASTER |
| 5 | 1101 108420171 (108420281) | 111111 (222222) | HHCD04 | BLANK | M31 | NOT FOR REGISTERATION AS NAME IN NAME REGISTER MASTER EXISTS |
| 6 | 1101 108420171 | 111111 | HHCD05 | BLANK | | GENERATE NAME REGISTER REFERENCE DATA SINCE NO DATA EXISTS IN NAME REGISTER MASTER & ORDERER GOODS CODE IS BLANK |

FIGURE 5

| No. | OFFICE CODE | MATERIAL CODE | SUPPLY COMPANY CODE | MAKER TYPE NAMES | FLAG | UNIFIED CODES | EXPLANATION |
|---|---|---|---|---|---|---|---|
| 1 | A71 | HHCD01 | AAAAA | BLANK | 1 | BLANK | |
| 2 | A71 | HHCD02 | AAAAA | JHCD02 | BLANK | M31 | |
| 3 | A71 | HHCD04 | AAAAA | JHCD04 | BLANK | M31 | |
| 4 | A81 | XXXX01 | AAAAA | JHCD04 | BLANK | M31 | |
| 5 | A81 | XXXX01 | BBBBB | JHCDXX | BLANK | M31 | |

FIGURE 6

| 261 | 262 | 263 | 264 | 265 | 266 | 116 |
|---|---|---|---|---|---|---|
| DATA CLASSI-FICATION | ORDERER CODE | SUPPLY COMPANY CODE | ORDERER GOODS NAME CODE | SUPPLY COMPANY GOODS NAME CODE | OFFIC CODE | |
| 0602 | 108420010 | 111111 | HHCD05 | BLANK | A71 | |

FIGURE 7A

| 271 | 272 | 273 | 274 | 275 | 276 | 117 |
|---|---|---|---|---|---|---|
| DATA CLASSI-FICATION | ORDERER CODE | SUPPLY COMPANY CODE | ORDERER GOODS NAME CODE | SUPPLY COMPANY GOODS NAME CODE | OFFIC CODE | |
| 0602 | 108420010 | 111111 | HHCD05 | JHCD05 | A71 | |

MATERIAL PROCUREMENT SYSTEM AND A MATERIAL PROCUREMENT METHOD

Priority is claimed to Japanese Application No. 2000-066019 filed on Mar. 10, 2000, herein incorporated by reference.

BACKGROUND OF THE INVENTION

1. Field of the Invention

This invention relates to a computer based materials or supplies order system and method for either combining orders for materials or supplies from a plurality of separate systems each of which has their own material codes, distributing or dividing the orders to reduce risk.

2. Description of the Related Art

Computer systems and Electronic Data Interchange (EDI) systems have been developed for purchasing materials. They are useful for improving accuracy and reducing work in purchasing. They are also useful for managing delivery dates appropriately.

Figure 10:
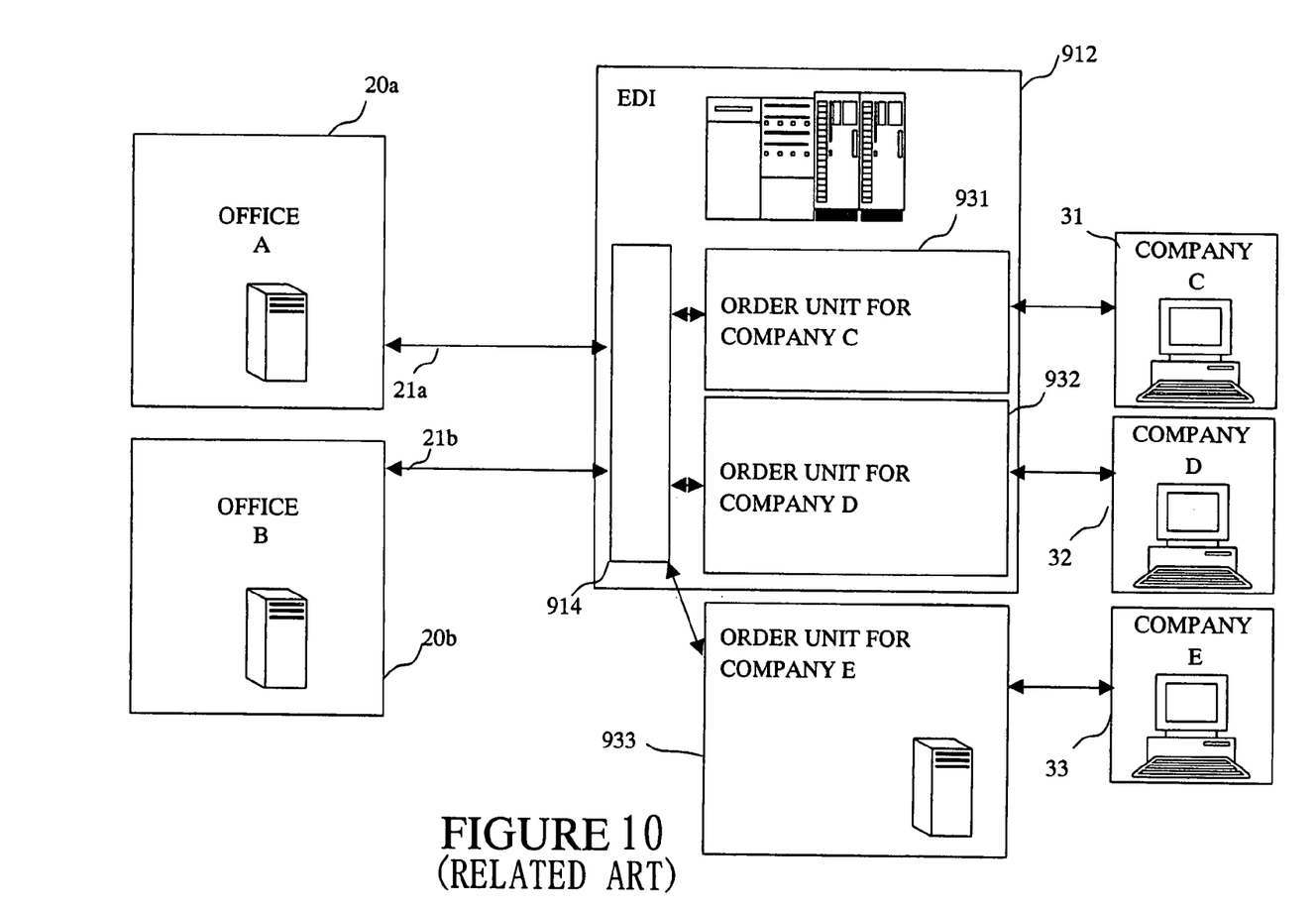
FIG. 10 shows a configuration chart of the material purchasing system according to the related art.

FIG. 10 illustrates a configuration of a material purchase system as a first example according to the related art.

In FIG. 10, an office A 20a and an office B 20b order materials from a company C 31, a company D 32, and a company E 33, with which office A has business relations. Data stored at offices A 20a and B 20b can include business data of the supply companies C, D and D, E, respectively, for example. Data 21a and 21b are sent to EDI 912 which is a centralized management system, and processed in the EDI 912. The EDI 912 includes an order unit 931 for the company C 31 and an order unit 932 for the company D 32 using telephone lines or the like and an order unit 933 for the company E 33 using the Internet. The order units 931 and 932 include an electronic mail box of the respective companies C and D and, additionally, office A 20a and order unit 932 may include stored business data of offices A and B. The order unit of company E can be represented by a web site and server on which the business data of office B 20b are stored. The EDI 912 also includes a classification processor 914 for classifying their order relationships.

An operation of the system at a time of ordering is explained based on this configuration.

The office A 20a has its own internal system (not illustrated) for managing productions, etc., which includes a customized material code system. The office B also has its own system which includes a customized material code system, which is different from the material code system in the office A. Since rationalization in production, sales, and distribution has been achieved in the respective offices, the code systems of the offices are not interchangeable.

Therefore, each office respectively orders from the companies C–E using its own code. The EDI 912, i.e., the centralized management system, orders and manages the orders through each order unit 931, 932, 933, if necessary. However, each office has generally selected a company with whom most of its orders are placed.

A material code used at a time of ordering is determined in a system of the office. However, in some cases, a goods name code of a supply company (company goods name code), provided by the supply company with which the order is placed and with which the office has business relations, has been written in addition to the material code of the office. This additional company good names code facilitates code conversion.

A second example according to the related art concerning code conversion is disclosed in Japanese Unexamined Published Patent Application HEI 5-143624. HEI 5-143624 discloses a technique for converting a material code of an orderer presented at a time of ordering to a unique goods name code of a supply company. This technique can prevent careless mistakes and reduce time for procurement. However, the technique only provides code conversion. Further, this technique is necessary as the code presented at the time of ordering is the code of the orderer. Therefore, it is desired to use goods name codes predetermined by the orderer for the business transactions.

Figure 11:
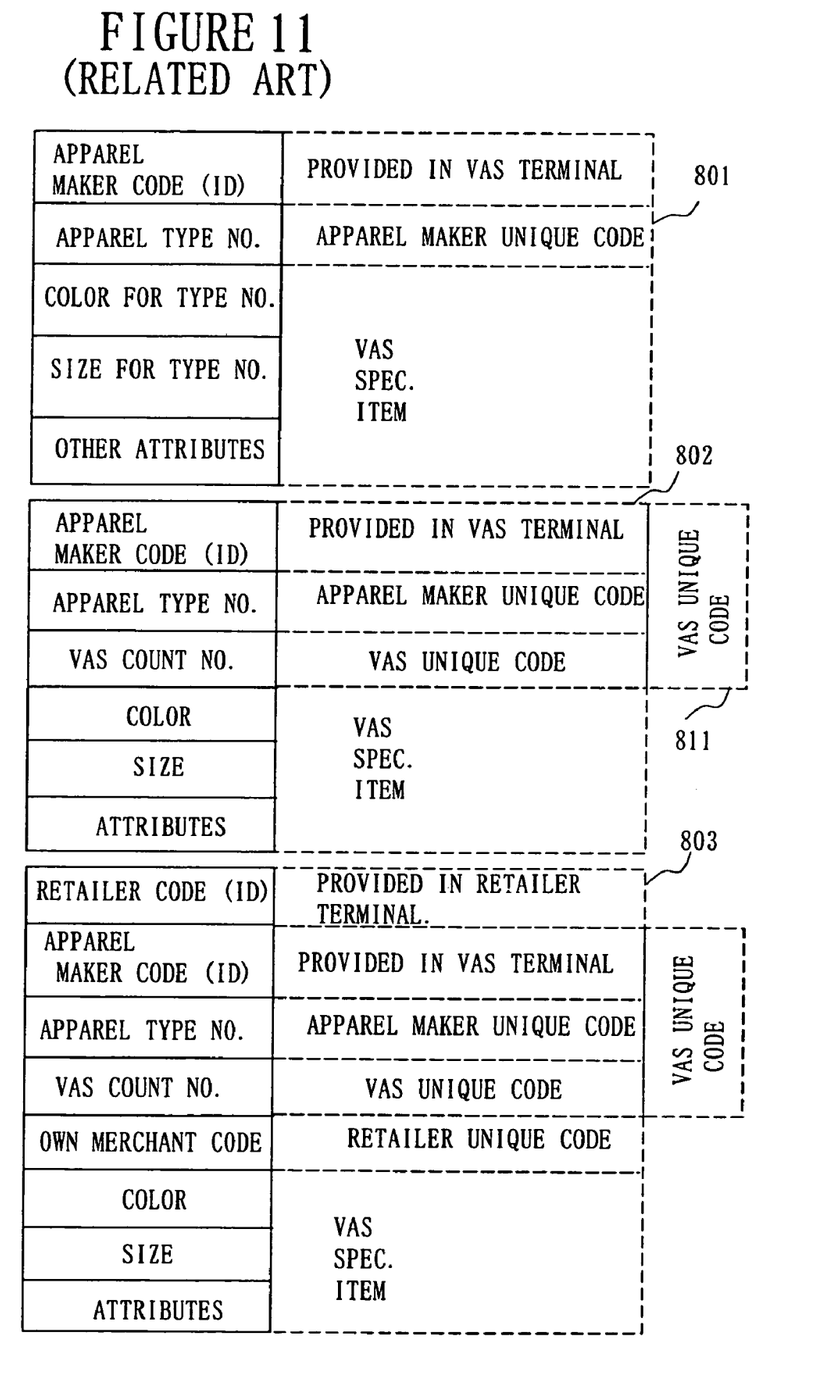
FIG. 11 shows a chart for explaining concept of a code conversion system by a VAS company according to the related art.

There is a system in which the code conversion is used to provide additional value in a technical field distinct from procurement system. Specifically, FIG. 11 illustrates a concept of code conversion in a code conversion system used by an intermediary dealer in apparel industries as a third example according to the related art. This is disclosed in Japanese Unexamined Published Patent Application HEI 6-259442.

In FIG. 11, a product code 801 inputted by an apparel maker and a VAS (Value Added Service) unified code 802 incorporated in an intermediary VAS company are illustrated. Apart 811 is added as a common sign for indicating this product later. At the same time, a retailer uses a code in a form 803 in which its own unique code is added. The apparel maker can know an amount of sales and a tendency in the sales of all retailers by accessing the intermediary VAS company 802, for example. The retailer can immediately know the stock of the maker by accessing the intermediary VAS company 802, for example. In these examples, both the apparel maker and the retailer use the part 811 indicated by the VAS unified code as the common code to exchange and modify data. Further, it is used as a conversion tool for simplified searching from one side.

SUMMARY OF THE INVENTION

In the material code systems according to the related art, since each orderer has a complicated production system of its own, it has been difficult to unify codes and order data from a plurality of orderers.

Further, since the orders are placed by using the codes of the orderers, a code conversion system as illustrated in the second example according to the related art must be operated for each orderer.

Furthermore, the code conversion system for mutually sharing sales and production data between the retailer and the apparel maker (producer) by unifying the codes is intended to collect data rather than for procurement of materials. Additionally, since end users in both sides use their own unique codes, an additional VAS unified code must be used in addition to their own codes.

It is one of objects of a preferred embodiment in the present invention to solve the above-stated problems. Particularly, a preferred embodiment of this invention provides a material procurement system and method, in which the orders can be combined by converting the codes of the plurality of the orderers to an original code of the supply company with business relations and/or orders are divided for distributing and reducing risk that the orders will not be filled properly.

The present invention is implemented as a material procurement system wherein a plurality of orderers having their own system of material codes procure materials from a supply company having business relations with the orderers. The system includes a name register master for making correspondence between supply company goods name codes provided by the supply company and the material codes of the orderers; and an order processor for referring to the name register master, and ordering the materials by combining the plurality of the orders from the same or different orderers, if appropriate, using the supply company goods name codes.

Further, the present invention can include an order distribution processor for dividing the orders and ordering from another company, if the materials in a quantity beyond a predetermined number are to be ordered.

Additionally, the present invention can include a name register reference data generator for generating name register reference data, if the supply company goods name codes provided by the supply company are unknown before ordering, and a name register master register unit for receiving the supply company goods name codes provided by the supply company with business relations, and registering the codes in the name register master.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

DETAILED DESCRIPTION OF PREFERRED EMBODIMENTS

Embodiment 1

Even though unification of the material codes is effective, if a new common code must be added for realizing the unification of the codes, this involves much work and time, and is thus unrealistic. In this circumstance, an equivalent effect with the unification of the codes is desired to be realized with less modification of the system. In a new system, orders of materials from a plurality of offices using various codes added by each office are combined, and ordering, delivering, and acceptance inspection can be made in a large volume for reducing cost. The system also intends to distribute and reduce the risk by dividing large orders which are larger than a preset limit. In this system, it is also possible to know a usage amount of particular goods, purchase strategically from various points of view, obtain statistical data, etc. Previously, these operations have been performed separately from the procurement, and have involved much work.

For unifying the material codes without providing a new unified code, unique supplier goods name codes which have been already provided by each of the supply companies with business relations should be used as the unified codes.

This method has not been realized, as the codes are provided by each of the ordering companies and the codes are not intended to become public. Further, it has been necessary for the orderer to confirm with the supply companies with business relations by using a telephone and facsimile, or talking in a meeting before ordering.

In embodiment 1, by solving the problems, a conversion table (master) is created and prepared to combine the orders.

Figure 1:
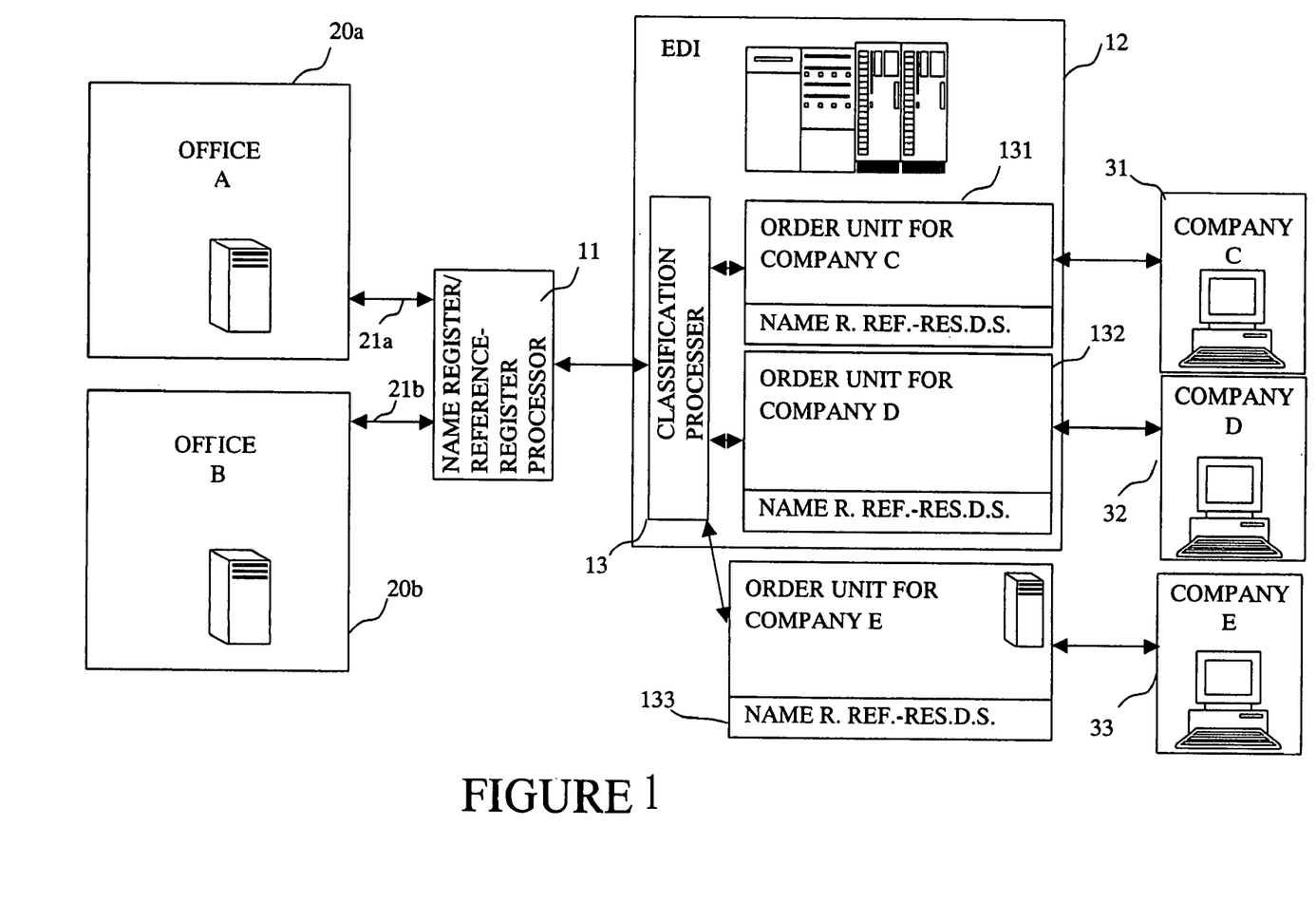
FIG. 1 shows a configuration chart of a system for ordering and managing materials in embodiment 1 of this invention.
Figure 2:
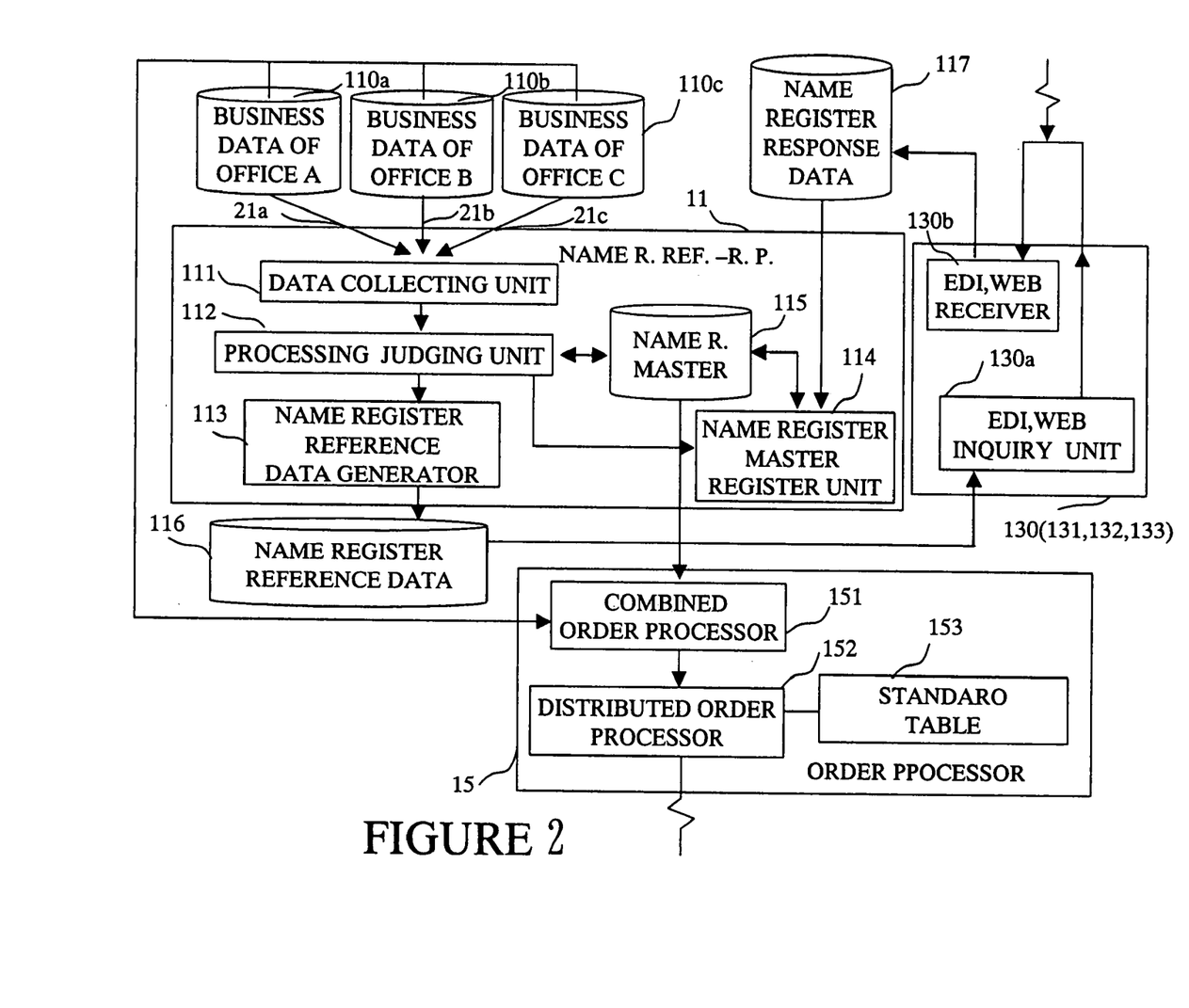
FIG. 2 shows a detailed configuration chart of a name register reference-register processor and an order processor in embodiment 1.

A configuration chart of a system for ordering and managing materials in embodiment 1 is illustrated in FIG. 1. A name register reference-register processor 11 and an order processor (not illustrated in FIG. 1) are illustrated in details in FIG. 2. In FIGS. 1 and 2, a name register reference-register processor 11 is an important new component. In FIGS. 1 and 2, an EDI (Electronic Data Interchange) 12 for ordering and managing orders electronically, a classification processor 13 for classifying data, and order units (including, e.g., mail boxes for the supply companies with which the respective companies have business relations, business data storage for the offices, and name register reference—register data storage) 131–133 for companies C–E respectively are illustrated. In this part, a function of asking for name register reference data and receiving response data is added to the configuration according to the related art (as shown in FIG. 1).

An order processor 15, and the supply companies C 31, D 32, and E 33 from which the materials are to be purchased are also illustrated. When the offices A 20a and B 20b need the materials, order data 21a, 21b and 21c are sent from offices A 20a, B 20b and C 20c to the name register reference—register processor 11. Then, the data are sent to each of the supply companies 31, 32, 33 with business relations after processing of receiving orders in the EDI 12. Business data storage 110a, 110b, and 110c for the offices A, B, and C respectively, a data collecting unit 111, a processing judging unit 112, a name register reference data generator 113, a name register master register unit 114, a name register master 115, name register reference data 116, name register response data 117, an EDI, Web inquiry unit 130a and an EDI, Web receiver 130b are also illustrated.

In embodiment 1, the order processor 15 is an important component like the name register reference—register processor 11. The order processor 15 includes a combined order processor 151, a distributed order processor 152 and a standard table 153 of risk distribution and competition effect on price.

Figure 3:
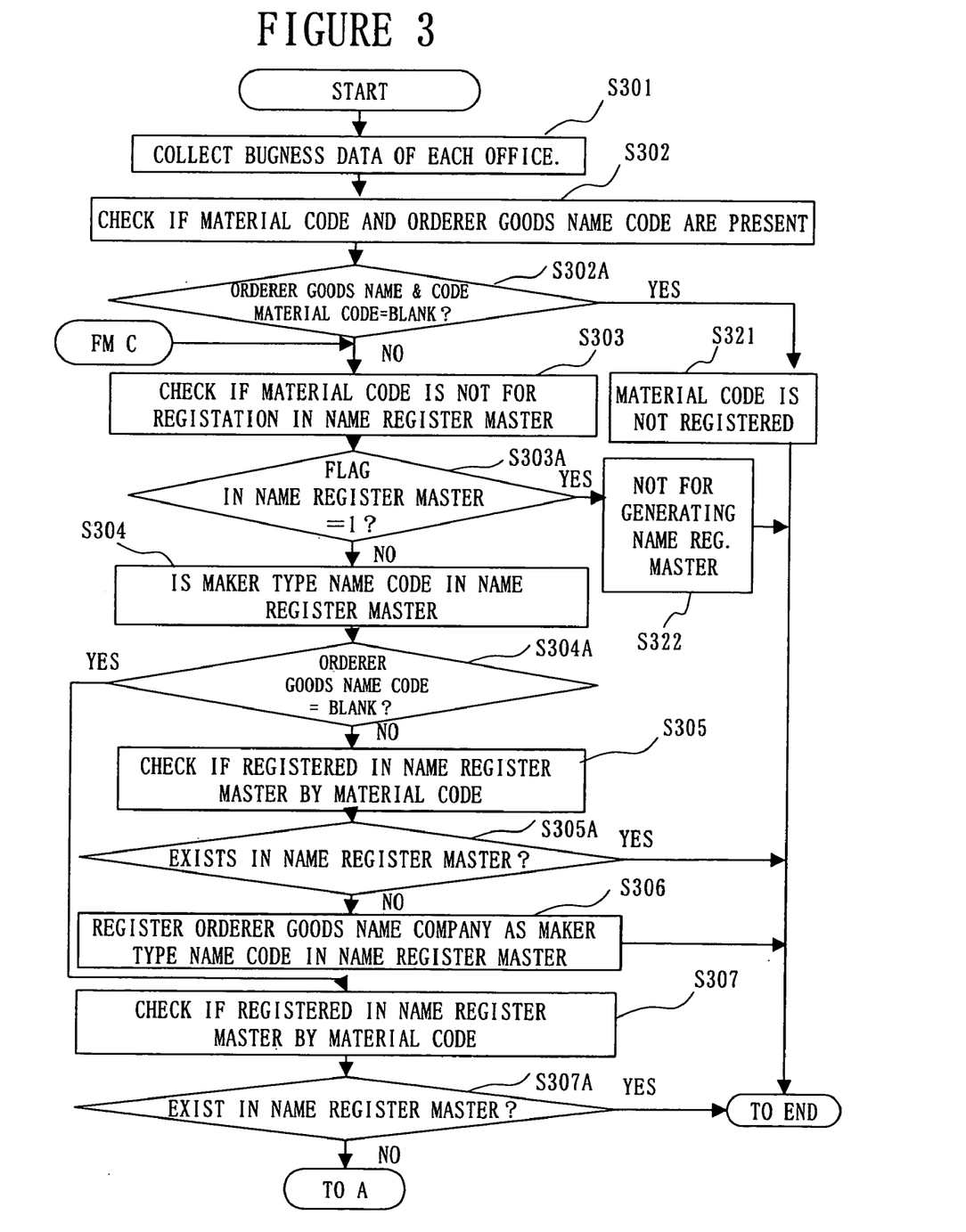
FIG. 3 shows an operation flow chart of registering a name register master and ordering.
Figure 4A:
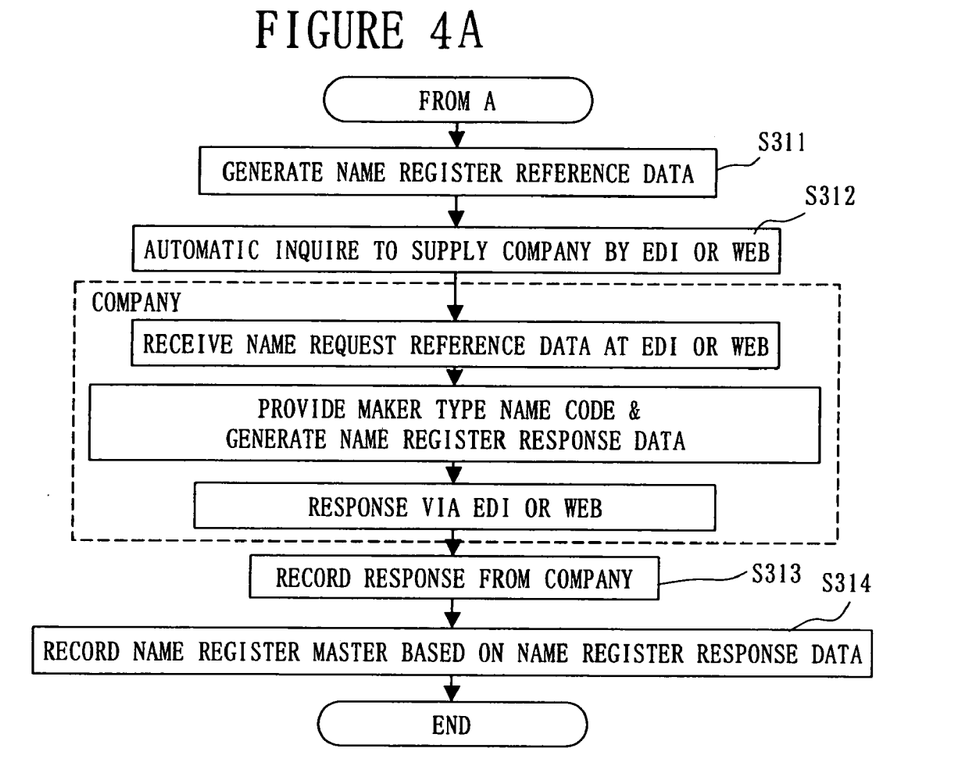
FIG. 4 shows an operation flow chart of registering a name register master and ordering.
Figure 4B:
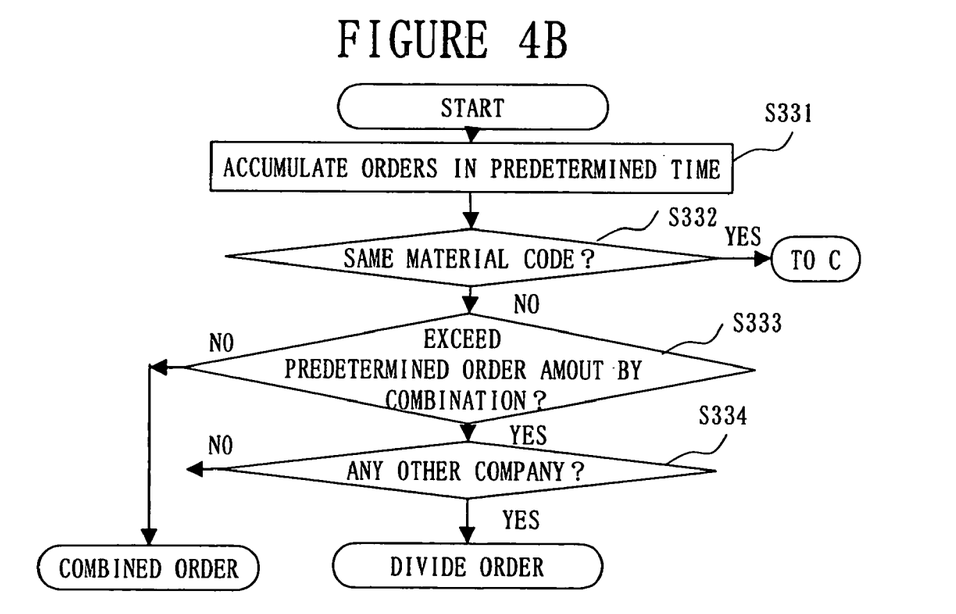
Figure 5:
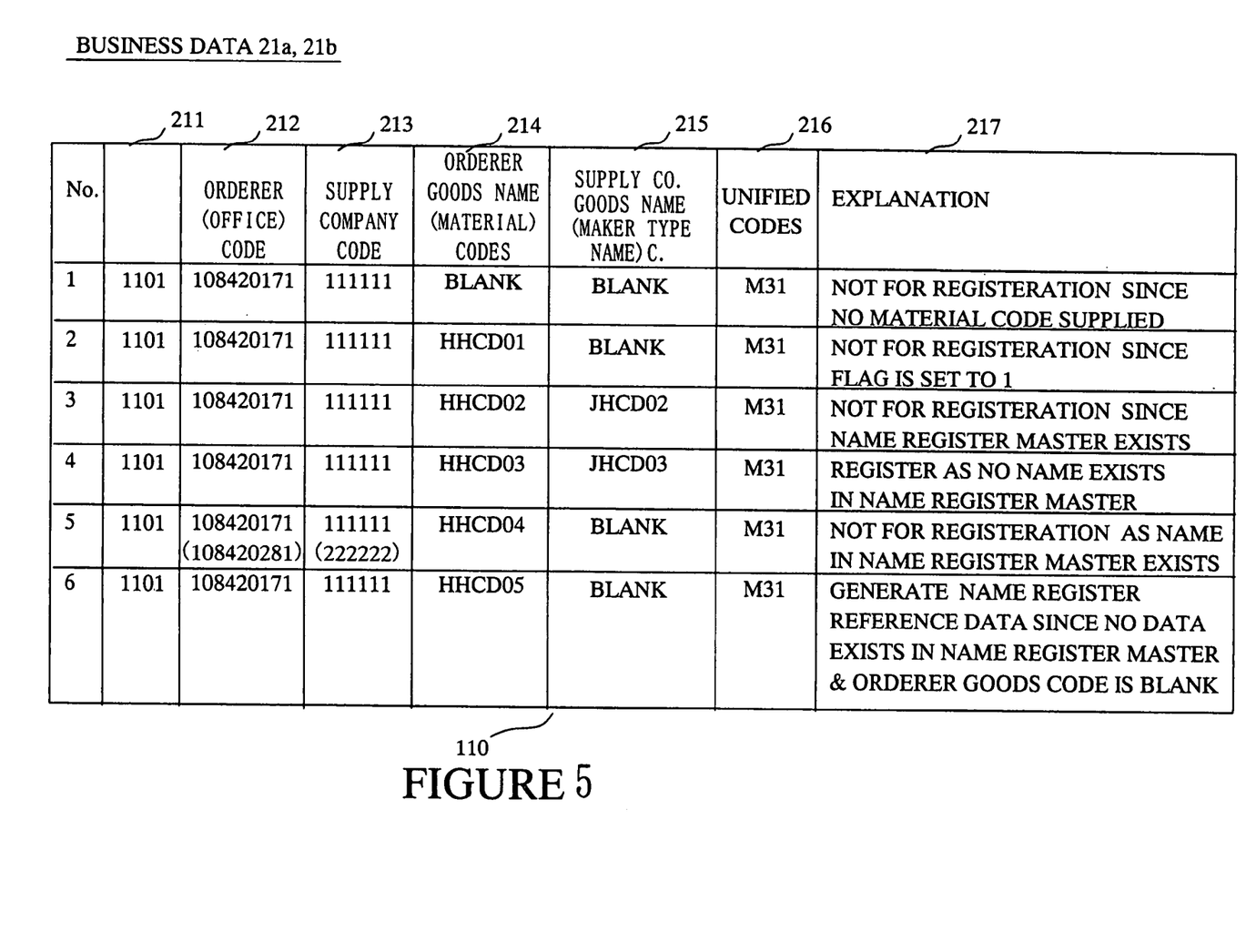
FIG. 5 illustrates an example of business data for explaining ordering operations.
Figure 6:
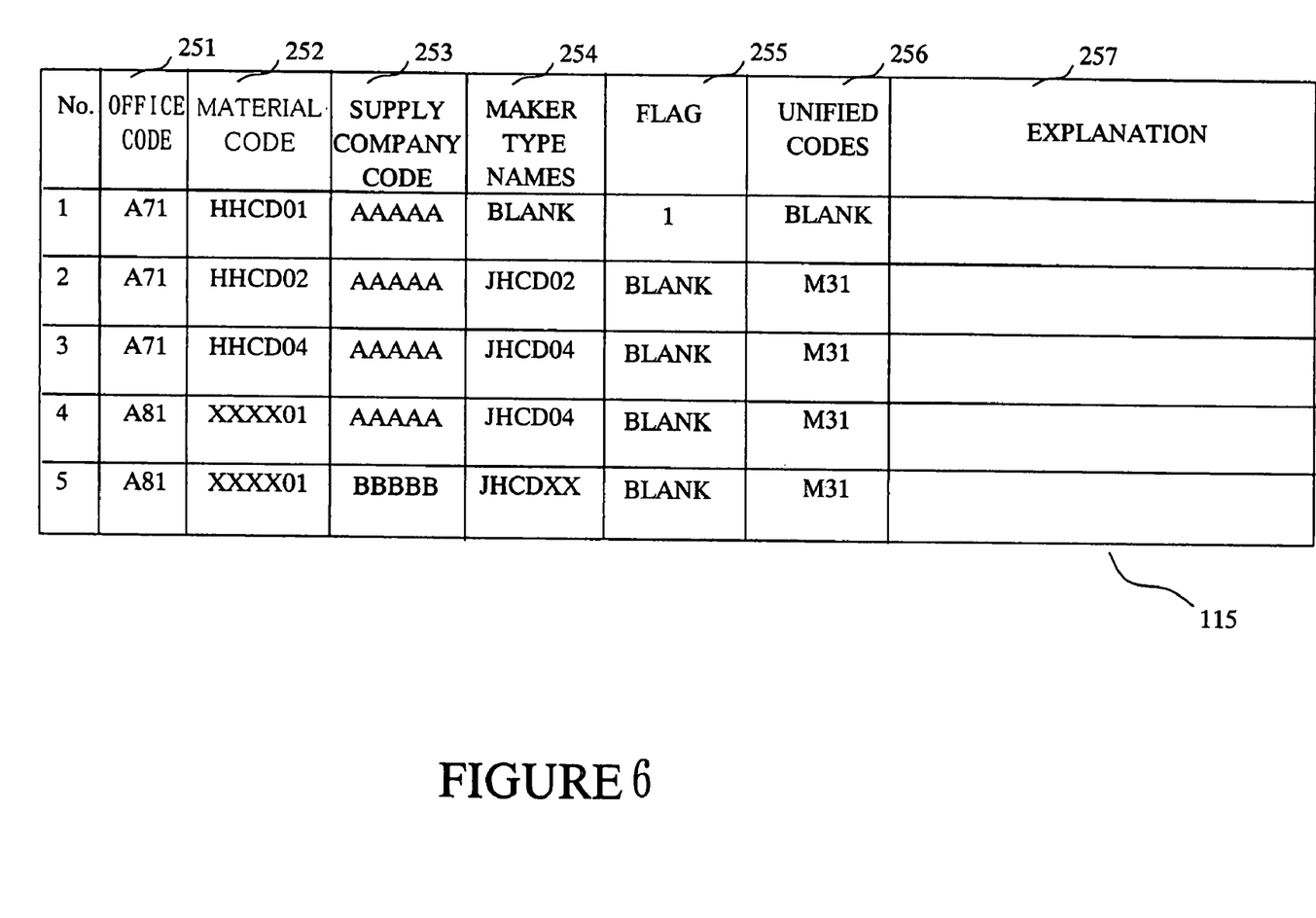
FIG. 6 illustrates an example of a name register master for explaining ordering operations.

FIGS. 3 and 4 are flow charts of operations of registering the name register master and ordering. FIG. 5 illustrates an example of business data for explaining the operation. FIG. 6 illustrates an example of data in the name register master, and FIG. 7 illustrates an example of name register reference data and name register response data.

In FIG. 6, codes 251 for showing offices, e.g., A71 (the office A) and A81 (the office B), material codes 252 used by the respective offices, codes 253 for showing supply companies with business relations, e.g., company C, D, etc., and codes 254 of maker type names provided by the makers are stored. In FIG. 6, a flag 255 for showing if the name register master is used at a time of ordering. If the order is not to be reformed into a combined purchase, a flag 1 is turned on. If the order is for combined purchase, the flag 255 is not turned on (blank). Unified codes 256 for statistics, etc. are added for processing statistically, if necessary. FIGS. 5 and 7 are described in the following explanations of the operations.

Operations are explained with reference to FIGS. 1–7.

Operations of creating the name register master, i.e., registering data in the name register master 114, are explained.

In FIG. 3, the data collecting unit 111 collects business data 21a and 21b from each of the offices A, B, 20a, 20b, etc. in step S301 ("step" is omitted, hereinafter). The business data are in a data form as illustrated in FIG. 5, for instance.

In FIG. 5, codes 212 for showing orderers, e.g., office A, etc., codes 213 for showing companies to which the materials are ordered, ordered goods name (material) codes 214, goods name codes (maker type name codes) 215 provided by the companies with business relations, and unified codes 216 added for processing statistically are stored. Each of the offices A 20a and B 20b have tried to support the supply companies C, D, E, by specifying the material code 214, the maker type name 215, etc. to the companies, e.g., company C 31.

The processing judging unit 112 performs processing in S302–S307. In S302, the processing judging unit 112 checks if the material code 214 and the orderer goods name code 264 are blank (e.g., not in the business data S302A). If these blanks are present, then it is determining that the material is not registered at S321, and the process of FIG. 3 ends. For example, if the orderer goods code 214 is blank (e.g., a purchase of the goods in No. 1 in FIG. 5 is not registered) in S321, the purchase is assumed to be temporary (an isolated purchase). However, in S303A if the orderer goods name or material code 214 is present, reference is made to the name register master 115. In example No. 2 of FIG. 5, the maker type name 215 is blank. Further, since the flag 1 indicates that the order is not for a combined purchase, in the flag 255, the purchase is judged as being not for a combined purchase in S322 and this process ends.

If the name register master 115 does not have a corresponding code to the orderer goods name code 214, i.e., the goods are not regularly purchased materials, it is checked if the master type name code 254 is already registered, in S304. If the maker type name code 254 is not registered in S304A and the code is not in the name register master 114, in S305, the name register master register unit 114 uses the goods name codes 215 of a supply company in the business data, and registers the goods name code 215 in the name register master 115 in S306.

If the goods are materials which are ordered regularly, and the goods name code 214 of the supply company is not known in S304, name register reference data (explained later) are generated, and an inquiry to a corresponding company with business relations is made.

In S307, the maker type code is checked against the name register master 115, and if it is not, the process flow goes to FIG. 4A, explained below. Otherwise, the process ends at S307A.

When the name register master 115 is created as stated, ordering of the materials from the company with business relations is processed. An operation flow chart of processing in combined/divided orders is shown in FIG. 4(b).

The combined order processor 151 combines the orders for a predetermined period from date written in the order data 21a of the office A, etc., and accumulates the orders from the plurality of the offices in S331. The combined order processor 151 refers to the name register master in S332. If there are orders with same codes 254 of the maker type name by referring to the name register master, the combined order processor 115 combines the orders with same goods names and orders. In No. 4 of FIG. 6, the office B (A81) orders the goods with the same maker type name JHCD04 of the same company with business relations, i.e., AAAAA, as the office A (A71) orders. This is a situation suitable for a combined order. In S333, the distributed processor 152 considers a risk in ordering the combined order from the same maker and competition in price. The distributed processor 152 determines whether to make a distributed order with reference to a standard table 153 for risk distribution and competition effect on price. If there is another company for the same goods, distributed orders are made when the risk or competition determination deems it appropriate. In No. 5 of FIG. 6, the office B (A81) purchases the goods (XXXX01) with the same material code 252 from another company. (In this case, another company is shown as BBBBB.) In this way, the distributed orders become possible.

The companies with business relations can use their own maker type names without being forced to use standardized codes. Therefore, additional work is not needed. Generally, the orderers can combine the orders by using existing maker type names without using new standardized codes to purchase in a large volume. Therefore, there is a possibility to lower a price through volume discounts. Further, since all usage amounts in the plurality of the offices can be known, an effective purchase strategy can be made. Further, management of the usage amount and processing of the statistics become easy.

Operations of referring to the name register to supplement insufficient data in the name register master are explained.

Figure 7A:
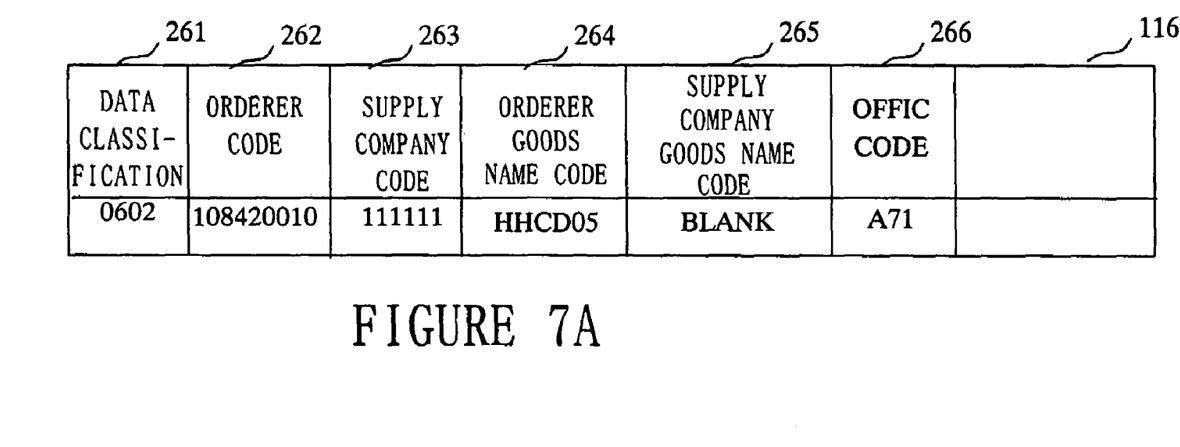
FIG. 7 illustrates an example of name register reference data and name register response data for explaining update operations of the name register master.
Figure 7B:
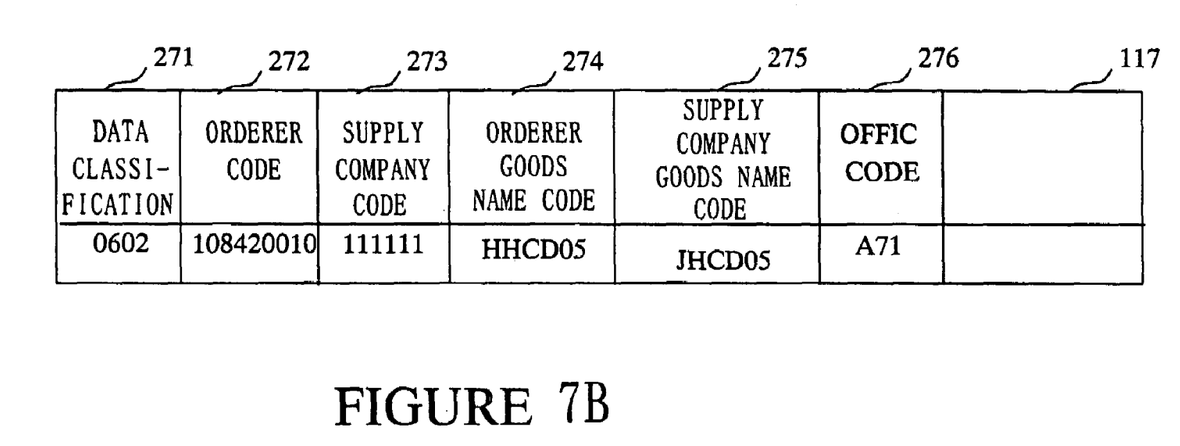

Assume that the code 254 of the maker type name is not in the name register master 115, and the code 254 of the maker type name is not known. If the flag 255 for showing if the name register master is used at a time of ordering is blank, it shows that a combined order should be made. Therefore, the maker type name must be known immediately. That is known in S304 and S307 in FIG. 3, and the name register reference data generator 113 generates name register reference data 116 as illustrated in FIG. 7A in S311 in FIG. 4A. In the name register reference data 116, a code of a control division which manages the name register master 115 is inputted as an orderer code 262, and a response is sent to the control division. A supply company code 263 shows the company with business relations. An orderer goods name code 264 is the code of the orderer, e.g., office A which orders the goods. An office code 266, e.g., A71 for the office A is also illustrated. These data are referred to by accessing the company with business relations, e.g., company C by the EDI, Web inquiry unit 130a through a line from a terminal or through the Internet at S312.

The name register master register unit 114 monitors the line and Internet connection regularly. When a response of required maker type name of the company with business relations is obtained in a form in FIG. 7B from the EDI, Web receiver 130b in S313, and data describing supply company goods name codes 275, which were blank, are obtained, the name register master register unit 114 registers the data in S314 and S306.

The case of supplementing the insufficient data has been explained. However, it is also possible to inquire regularly, and update with new data.

In this system, the name register master 115 is one of the most important components. Therefore, it is important to supplement insufficient data in the name register master 115. A method for periodically requesting to supplement the insufficient data is explained.

Figure 8:
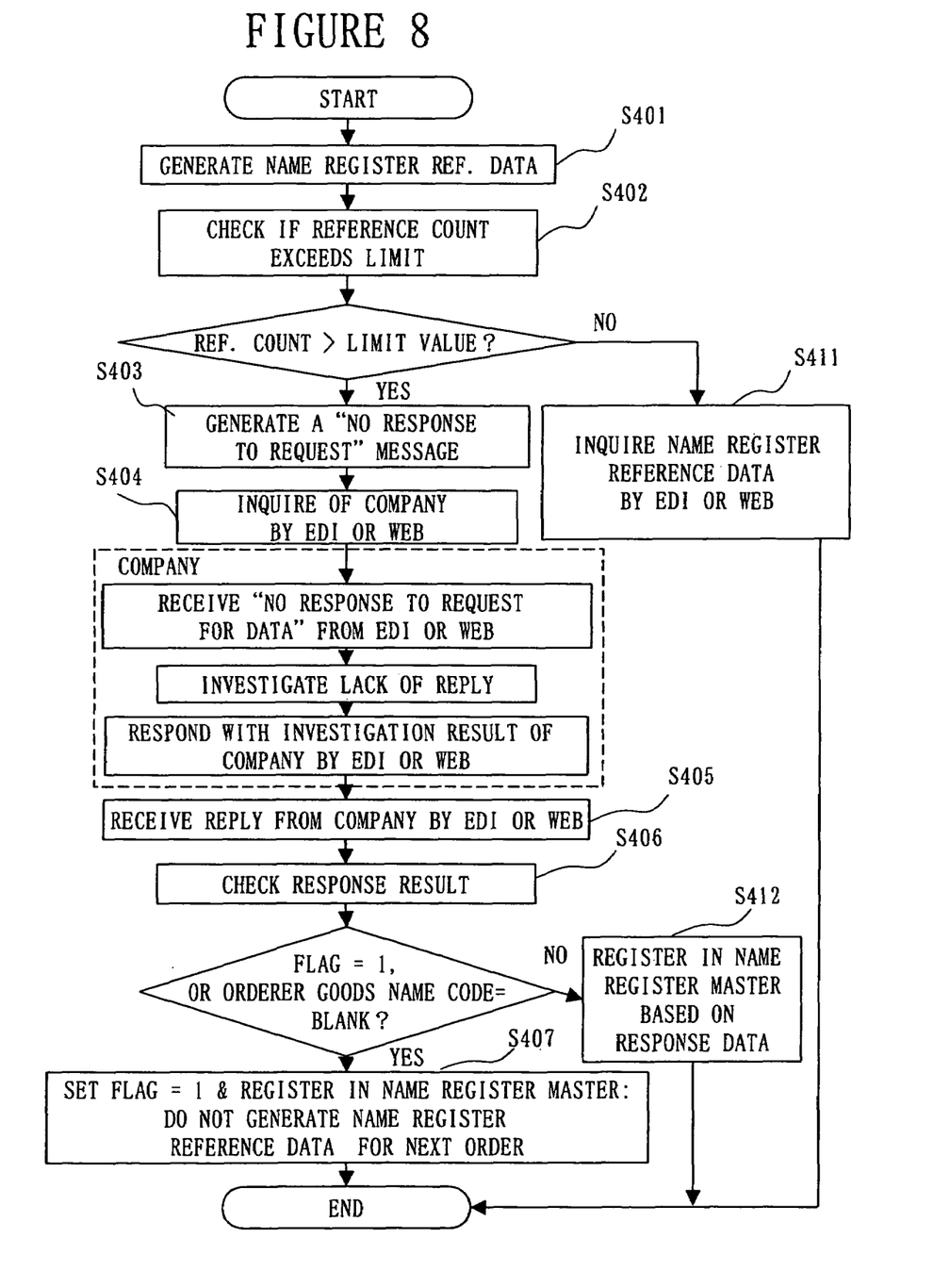
FIG. 8 shows an operation flow chart of requesting to supplement insufficient data in the name register master in embodiment 1.

FIG. 8 shows an operation flow chart of requesting to supplement the insufficient data. In the operation flow chart of ordering in FIG. 3, data without the supply company goods name (maker type name) codes are extracted in S307 and S307A. In FIG. 4A, name register data are generated in S311. S401 in FIG. 8 is same as S311. In this routine, a number of times a request for supplemental information has been requested is counted in S402. If it is judged that it has reached a number which needs a limit value, name register reference data sent to the company with business relations are generated in S403, and sent from the EDI, Web inquiry unit 130a in S404.

When a response result is received via the Web receiver 130b in S405, if information of the insufficient data is supplemented in S406, the name register master is updated in S412.

If a content is insufficient in S406, and there is another company for ordering same goods, the company which has sent insufficient response may be deleted from the name register master concerning on the goods in S407.

Further, a maintenance method of the name register master and a method for limiting an increase of a data amount are explained. In the methods, materials without an order for a long time are periodically deleted.

Figure 9A:
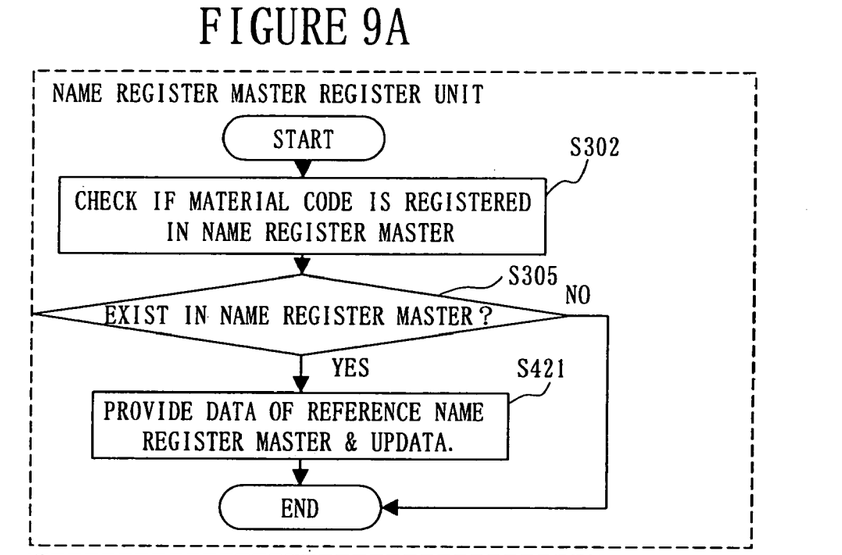
FIG. 9 shows an operation flow chart of deleting an unused goods name in the name register master in embodiment 1.
Figure 9B:
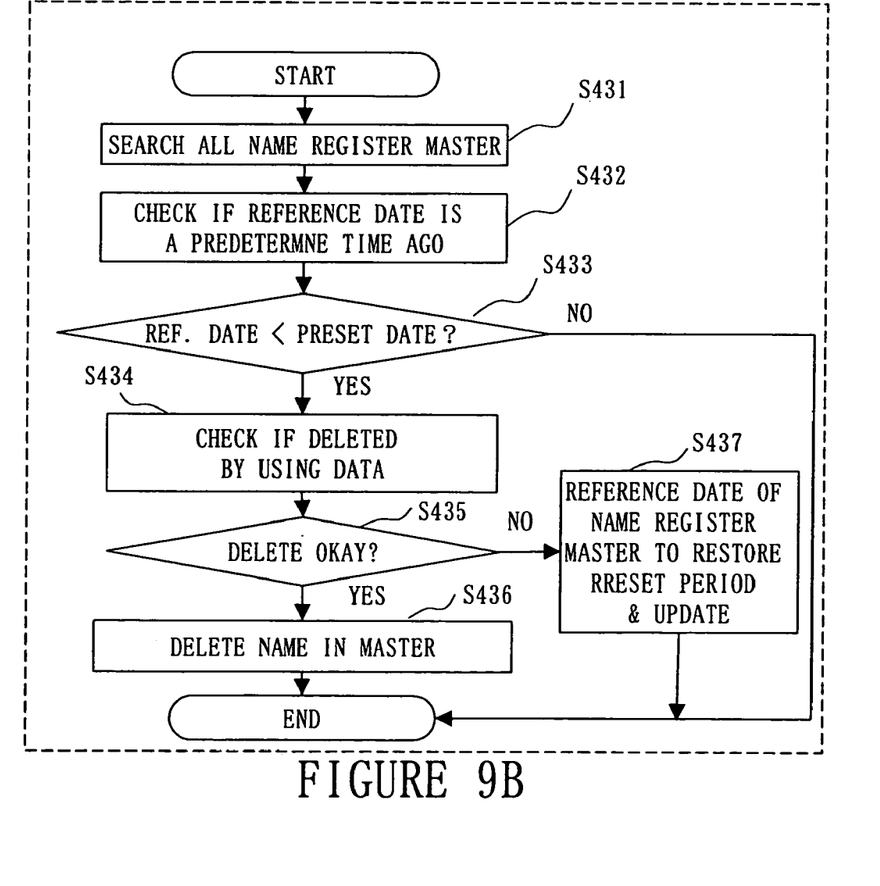

An operation flow chart is shown in FIGS. 9A and 9B.

In FIG. 9A, deletion of data is being prepared using the same step S302 of FIG. 3. Even if the data are registered in the name register master in S305 of FIG. 3, a step for recording date of referring to the name register master for ordering in S421 is added.

In FIG. 9B, processing of deleting unused items in the name register master is started in a rather long interval, e.g., six months or one year. In S431, searching is started, and items of each of the goods are browsed. In S432, most recent reference dates are extracted. Goods which are unused for a long time are extracted in S434. Then, a judgement is made on the goods later again in S437, or the data are deleted from the name register master after judging in S436.

In this way, the increase of the data amount in the name register master can be managed.

In the embodiments, explanations are made on the system. However, even if a system with the specific methods is not configured, a same effect can be realized by providing the name register master by using a general computer and performing the operations in FIGS. 3–9.

In this explanation, the orderer is the office. However, even if the orderer is another company instead of the office, it is possible to realize a same effect. This terminology is only used to aid in understanding and is not limiting to the scope of the invention.

As stated, this invention provides the name register master for making correspondence between the goods name codes provided by each of the companies with business relations and the orderer goods name codes, a method for combining orders of the materials with same goods name codes of the companies with business relations, and a method for dividing the orders. Therefore, this invention reduces work of converting the codes by the companies with business relations. Further, operations after ordering from a plurality of orderers can be rationalized. Hence, this invention is very effective for reducing a length of time of work and mistakes in the operations.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

The invention claimed is:

1. A material procurement system, wherein a plurality of orderers having their own system of material codes procure materials from a supply company with business relations with the orderers, comprising:
   a name register master for making correspondence between supply company goods name codes provided by the supply company and the material codes of the orderers;
   an order processor for referring to the name register master, and ordering materials by combining a plurality of orders from at least one of a same orderer and different orderers, using the supply company goods name codes, wherein said material procurement system is separate from said supply company;
   a name register reference data generator for generating name register reference data, if the supply company goods name codes provided by the supply company are unknown before ordering; and
   a name register master register unit for receiving the supply company goods name codes provided by the supply company with business relations, and registering the codes in the name register master.

2. The material procurement system in claim 1, further comprising an order distribution processor for dividing the orders and ordering from another company, if the materials in a quantity beyond a predetermined number are to be ordered.

3. The material procurement system in claim 1, wherein the name register reference data are sent from a terminal to the supply company with business relations and the supply company goods name codes are received from the supply company as a response to the name register reference data for the name register master.

4. The material procurement system in claim 1, wherein no response request data are sent to the supply company, if one of a period of counting and a count number reaches a predetermined value.

5. The material procurement system in claim 1, wherein an update period of the name register master is determined, and a fact of reference to the name register master is recorded, and wherein corresponding data are deleted from the name register master, unless the fact of reference is recorded during the update period.

6. A material procurement method, wherein a plurality of orderers having their own system of material codes procure materials from supply companies with business relations with the orderers, comprising:

registering in a name register master to make correspondence between supply company goods name codes and material codes of the orderers;
referring to the name register master in case of procuring necessary materials from the supply company;
combining the procurement of the plurality of the orderers and procuring by using the supply company goods name codes, without action by the supply companies;
generating name register reference data, if the supply company goods name codes provided by the supply company are unknown before ordering; and registering the supply company goods name codes provided by the companies with business relations in the name register master after receiving the codes.

7. The material procurement method in claim 6, further comprising dividing the orders and ordering to another supply company by referring to the name register master, if the materials in a quantity beyond a predetermined number are to be ordered.

* * * * *

UNITED STATES PATENT AND TRADEMARK OFFICE
CERTIFICATE OF CORRECTION

| | | |
|---|---|---|
| PATENT NO. | : 7,020,627 B1 | Page 1 of 1 |
| APPLICATION NO. | : 09/718384 | |
| DATED | : March 28, 2006 | |
| INVENTOR(S) | : Mitsuru Takeuchi et al. | |

It is certified that error appears in the above-identified patent and that said Letters Patent is hereby corrected as shown below:

Section 75 (Inventors): change "Masimo" to --Mashimo--.

Signed and Sealed this

Eighteenth Day of July, 2006

JON W. DUDAS
*Director of the United States Patent and Trademark Office*